United States Patent [19]

Bloom et al.

[11] 4,105,654
[45] Aug. 8, 1978

[54] LIQUID CRYSTALLINE 4″-CYANO- OR 4″-NITROBENZYLIDENE-4′-(N,N-DIALKYLAMINO)-1-AMINOAZABENZENE DYES

[75] Inventors: Allen Bloom, East Windsor; Ling Kong Hung, Edison, both of N.J.

[73] Assignee: RCA Corporation, New York, N.Y.

[21] Appl. No.: 741,538

[22] Filed: Nov. 12, 1976

[51] Int. Cl.² .................. C07C 107/06; C09B 29/08; C09K 3/34
[52] U.S. Cl. .................................. 260/205; 252/299; 260/152; 260/465 D; 350/349; 350/356; 560/86; 560/72
[58] Field of Search .................. 260/205; 252/299; 350/160 LC

[56] References Cited

U.S. PATENT DOCUMENTS 3,705,329  11/1972  Castellano ............... 350/150

OTHER PUBLICATIONS

Landholt–Bornstein, "Zahlenwerte und Funrtione aus Phvser, Chemie, Astronomie, Geophysik und Technik," pp. 266, 267 and 323-325, (1960).

Yoshio et al., Chemical Abstracts, vol. 81, #11355y, 11356z and 11357a, (1974).

Akio et al., Chemical Abstracts, vol. 83, #69147j, 69148k, 69149m, (1975).

Murakami et al., Chemical Abstracts, vol. 84, #179850m (1976).

*Primary Examiner*—Floyd D. Higel
*Attorney, Agent, or Firm*—H. Christoffersen; Birgit E. Morris

[57] ABSTRACT

Compounds of the formula

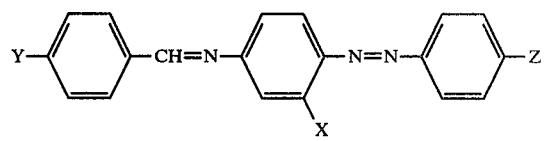

wherein Y and Z are different and one is nitro or cyano and the other is —N(R)₂ wherein R is alkyl or alkylene, preferably of 1 to 4 carbon atoms, and X can be hydrogen, methyl, fluoro or chloro, are dyes having liquid crystal properties.

5 Claims, 1 Drawing Figure

U.S. Patent
Aug. 8, 1978
4,105,654
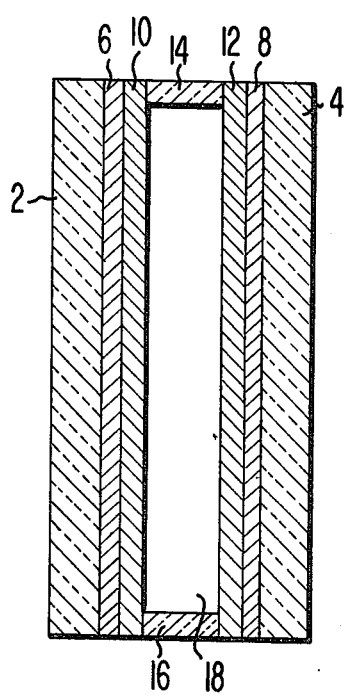

LIQUID CRYSTALLINE 4''-CYANO- OR 4''-NITROBENZYLIDENE-4'-(N,N-DIALKYLAMINO)-1-AMINOAZABENZENE DYES

This invention relates to novel liquid crystal devices. More particularly, this invention relates to liquid crystal mixtures and devices containing novel liquid crystalline dyes.

BACKGROUND OF THE INVENTION

Electro-optic devices containing liquid crystal compounds have become commercially important recently because of their low power requirements and good contrast, particularly for applications such as watch faces, calculator displays and the like. Although liquid crystal compounds have been known for many years, the discovery of nematic liquid crystals having a mesomorphic transition temperature range that spans room temperature sparked a renewed interest in these materials and greatly expanded their marketability. Research is continuing to discover new room temperature liquid crystal compounds and mixtures of liquid crystal compounds having improved contrast in electro-optic devices.

SUMMARY OF THE INVENTION

We have discovered novel liquid crystal dye compounds, 4''-cyano- or 4''-nitro-benzylidene-4'-(N,N-dialkylamino)-1-aminoazobenzenes and 4''-N,N-dialkylaminobenzylidene-4'-cyano- or 4'-nitro-1-aminoazobenzene. These liquid crystals, when admixed in small amounts with low melting liquid crystal materials, impart strong colors to the mixtures, but without materially affecting the transition temperature range of the liquid crystal composition to which they are added. The present dyes thus improve the contrast of electro-optic devices employing these liquid crystal materials, and impart decorative colors in the orange to red to brown hues, without adversely affecting other properties of the liquid crystals.

BRIEF DESCRIPTION OF THE DRAWING

The FIGURE is a cross-sectional view of an electro-optic device embodying the invention.

DETAILED DESCRIPTION OF THE INVENTION

The novel liquid crystal dyes of the present invention have the formula:

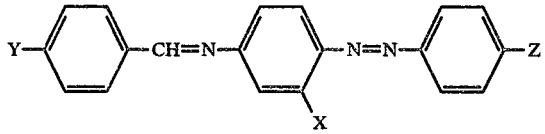

wherein Y and Z are different and one is nitro or cyano and the other is —N(R)$_2$ wherein R is alkyl or alkylene of 1–8, preferably of 1 to 4 carbon atoms, and X can be hydrogen, methyl, fluoro or chloro.

These dyes encompass a rather broad spectrum of mesomorphic temperature ranges and have deep colors. They can be admixed with lower melting liquid crystal compositions in small amounts to impart color to the liquid crystals so that cells including them exhibit improved contrast.

The above-described liquid crystalline dyes can be prepared by reacting an appropriate benzaldehyde and a suitable aminoazobenzene or substituted derivative thereof in solution. Para-toluenesulfonic acid can be employed as a catalyst. The product is isolated and purified in known manner, as by recrystallization or column chromatographic techniques.

The dyes can be admixed with nematic liquid crystal compositions to impart a color characteristic of each dye. Low melting nematic liquid crystal compositions, particularly p-alkoxybenzylidene-p'-alkylanilines and their mixtures with other liquid crystals, and mixture of p-alkoxy- or p-acyloxybenzylidene-p'-cyanoanilines, or mixtures of p-cyanophenyl-p'-alkylbenzoates and p-phenylene-2,4-dialkylbenzoates have a transition temperature range that includes room temperature, and are particularly suitable. The exact amount of dye to be added depends on the solubility of the dye in the liquid crystal composition and also on the color desired. In general, from about 0.05% up to about 2% by weight of the dyestuff in the liquid crystal mixture, and preferably from about 0.2% to 0.4% by weight of the dyestuff, will be employed.

P-alkoxybenzylidene-p'-butylanilines are known liquid crystals and are described for example in U.S. Pat. No. 3,829,491 which issued Aug. 13, 1974 to Strebel. Mixtures of p-methoxybenzylidene-p'-n-butylaniline (hereinafter referred to as MBBA) and p-ethoxybenzylidene-p'-n-butylaniline (hereinafter referred to as EBBA) have particularly broad and low use temperature ranges. Mixtures containing about 35 to about 70% by weight of MBBA are preferred.

P-alkoxybenzylidene-p'-cyanoanilines are also known and are described in U.S. Pat. No. 3,499,702, issued Mar. 10, 1970, to Goldmacher et al. A mixture containing 85% by weight of a 70:30 molar ratio of MBBA and EBBA and 15% by weight of p-ethoxybenzylidene-p'-aminobenzonitrile has been disclosed by H. A. Tarry, *Services Electron Research Laboratory Technical Journal*, Vol. 23, No. 1, 1973. P-acyloxybenzylidene-p'-cyanoanilines have been disclosed by Castellano in U.S. Pat. No. 3,597,044.

In preparing an electro-optic device, the liquid crystal compounds should be rigorously purified to remove ionic and nonionic impurities which may react to degrade the liquid crystal compounds either by decomposition, transubstitution reactions and the like. For commercially acceptable cells, the liquid crystal compounds should be purified so that their resistivity is $1 \times 10^{11}$ ohm-cm or higher.

After the desired liquid crystal compounds are mixed together, a small amount of a chiral aligning agent is advantageously added. The aligning agent serves to orient the molecules of the mixture in the same direction since chiral compounds normally twist in a right-handed or left-handed direction. Suitable aligning agents include cholesteryl derivatives, such as cholesteryl halides, cholesteryl esters and the like; optically active compounds such as d- or l-α-pinene, d- or l-octanol and chiral esters such as 4-propylphenyl-4'-(4''-2-methylbutylphenylcarboxy)-2-chlorobenzoate having the formula

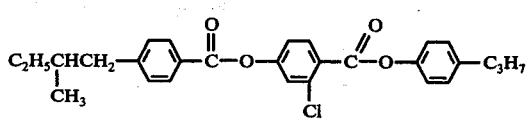

and the like. The amount of the chiral aligning agent added is not critical, but in general from about 0.05 to about 2.0% by weight of the liquid crystal composition is suitable, providing the mixture remains nematic.

Referring to the FIGURE, a liquid crystal cell is constructed from two glass plates 2 and 4 having conductive indium-doped tin oxide coatings as electrodes 6 and 8, respectively, on facing surfaces thereof. Thin silicon oxide layers 10 and 12 are evaporated onto the conductive layers 6 and 8, respectively, at an angle of 60°. These layers act to align the liquid crystal material. One-half mil (25.4 microns) thick glass frit spacers 14 and 16 maintain the coated glass plates 2 and 4 apart to complete the cell components. The cell is baked at 525° C. to melt the glass frit and seal the cell except for a single fill port. The cell is filled with the desired liquid crystal composition 18 in the isotropic state and hermetically sealed with a solder.

The invention will be further illustrated by the following Examples but it is to be understood that the invention is not meant to be limited to the details disclosed therein. In the Examples, parts and percentages are by weight unless otherwise noted.

EXAMPLE 1

Preparation of 4"-cyanobenzylidene-4'-(N,N-din-hexylamino)-3-methyl-1-aminoazobenzene A reaction mixture of 0.53 gram (3.5 millimols) of p-cyanobenzaldehyde, 0.79 gram (2 millimols) of 4'-(N,N-di-n-hexylamino)-3-methyl-1-aminoazobenzene, 150 ml of benzene and about 3 mg of p-toluenesulfonic acid was charged to a reaction vessel equipped with a magnetic stirrer and a reflux condenser topped with a graduated cylinder Claison adapter. The mixture was stirred at reflux until reaction had stopped as monitored by thin layer chromatography. The reaction mixture was filtered through a 150 gram silica gel bed and the product eluted with benzene. The solvent was removed by a flash rotary evaporator and the product purified by repeated column chromatography.

The product was recrystallized from hexane repeatedly until a thin layer chromotogram showed only a single spot.

4"-cyanobenzylidene-4'-(N,N-di-n-hexylamino)-3-methyl-1-aminoazobenzene having the formula

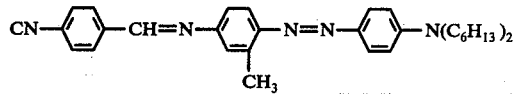

was obtained in 72% yield (0.73 gram).

The structure was confirmed by elemental analysis: C calculated, 78.11%; Found, 78.29%; H calculated, 8.09%; Found, 8.14%.

This compound was orange-red in color and was monotropic, having a solid to nematic transition temperature of 94–95° C. and a melting point of 110.5° C.

EXAMPLES 2 - 11

Several additional compounds were prepared. The general procedure of Example 1 was followed, substituting the appropriate starting materials. Table I below summarizes the analyses, mesomorphic temperature ranges and colors of the dyestuffs obtained.

Table I

| Ex. | Compound | Carbon, calc, % | Carbon, found % | H, calc, % | H, found | Yield % | Color | Mesomorphic Temperature CN,° C | NL,° C |
|---|---|---|---|---|---|---|---|---|---|
| 2 | CN—⟨⟩—CH=N—⟨⟩—N=N—⟨⟩—N(CH₃)₂ | 74.79 | 74.76 | 5.38 | 5.43 | 62 | orange-red | 248 | 252 |
| 3 | CN—⟨⟩—CH=N—⟨⟩—N=N—⟨⟩—N(C₂H₅)₂ | 75.59 | 76.04 | 6.04 | 6.15 | 57 | orange-red | 211 | 255 |
| 4 | CN—⟨⟩—CH=N—⟨⟩(CH₃)—N=N—⟨⟩—N(C₂H₅)₂ | 75.94 | 75.63 | 6.33 | 6.43 | 60 | red | 151.3 | 103.3–111.3* |
| 5 | NO₂—⟨⟩—CH=N—⟨⟩—N=N—⟨⟩—N(C₂H₅)₂ | 68.83 | 68.72 | 5.74 | 5.57 | 78 | red | 235 | 257 |
| 6 | NO₂—⟨⟩—CH=N—⟨⟩(CH₃)—N=N—⟨⟩—N(C₂H₅)₂ | 69.40 | 69.54 | 6.02 | 6.18 | 64 | red-brown | 164 | 120–132* |
| 7 | CN—⟨⟩—CH=N—⟨⟩—N=N—⟨⟩—N(CH₂CH₂)₂ | 75.99 | 75.60 | 5.54 | 5.55 | 33 | red | 187 | 236 |
| 8 | CN—⟨⟩—CH=N—⟨⟩—N=N—⟨⟩—N(C₄H₉)₂ | 76.89 | 76.59 | 7.09 | 7.16 | 37 | orange-red | 72 | 175 |
| 9 | CN—⟨⟩—CH=N—⟨⟩(CH₃)—N=N—⟨⟩—N(C₄H₉)₂ | 77.16 | 77.54 | 7.32 | 7.46 | 68 | orange-red | 54 | 122 |

Table I-continued

| Ex. | Compound | Analytical Data Carbon, calc, % | Carbon, found % | H, calc, % | H, found | Yield % | Color | Mesomorphic Temperature CN,° C | NL,° C |
|---|---|---|---|---|---|---|---|---|---|
| 10 | NO₂—⌬—CH=N—⌬—N=N—⌬—N(C₄H₉)₂ | 70.90 | 70.70 | 6.78 | 6.77 | 38 | orange-red | 84 | 184 |
| 11 | CN—⌬—CH=N—⌬—N=N—⌬—N(C₆H₁₃)₂ | 77.89 | 78.02 | 7.91 | 7.84 | 51 | orange-red | 88.5 | 129 |

*monotropic

EXAMPLE 12

The liquid crystal dyes prepared in Examples 1–11 were admixed with lower temperature mixtures of liquid crystals and the mesomorphic temperature ranges of the mixtures measured.

The Schiff base liquid crystal host contained 85% by weight of a 70:30 mol ratio of MBBA and EBBA and 15% by weight of p-ethoxybenzylidene-p'-aminobenzonitrile. This mixture has a nematic to isotropic liquid transition temperature of 63° C.

The ester liquid crystal host is available commercially from Hoffman-LaRoche as RO-TN-101 and is a mixture of three parts of p-cyanophenyl-p'-alkylbenzoates of the formula

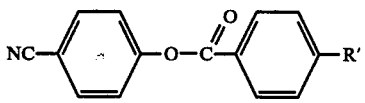

and one part of a p-phenylene-2,4-dialkylbenzoate of the formula

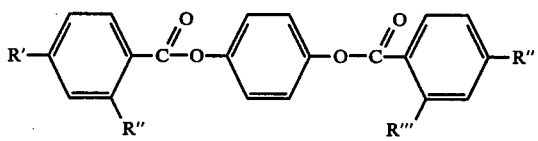

wherein R', R" and R'" are alkyl groups.

The data are summmarized below in Table II.

Table II

| Compound Sample No. | Host Liquid Crystal | Weight % of Dye | Nematic to Isotropic Transition Temperature, ° C |
|---|---|---|---|
| 1 | Ester | 0.33 | 48–66 |
| 2 | Ester | 0.39 | 70.7–72.5 |
| 2 | Schiff Base | 0.228 | 31.5 |
| 3 | Ester | 0.34 | 70.7–71.5 |
| 3 | Schiff Base | 0.203 | 47 |
| 4 | Ester | 0.19 | 69–71.5 |
| 5 | Ester | 0.26 | 70–70.5 |
| 5 | Schiff Base | 0.287 | 52 |
| 6 | Ester | 0.23 | 70–71.2 |
| 7 | Ester | 0.26 | 70.5–72 |
| 8 | Ester | 0.4 | 62.5–65 |
| 8 | Schiff Base | 0.224 | 28.5 |
| 9 | Ester | 0.40 | 69.5–71 |
| 10 | Ester | 0.38 | 70–71 |
| 10 | Schiff Base | 0.204 | 29 |
| 11 | Ester | 0.20 | 69–71.5 |

EXAMPLE 13

A mixture of 0.21% of the liquid crystal dye of Example 11 in the ester host liquid crystal mixture of Example 12 was charged to a liquid crystal cell as in the FIGURE. The liquid crystal mixture was aligned in a direction parallel to the electrode of the cell. The optical density, as seen through plane polarized light parallel to the liquid crystal orientation, was measured at the visible absorption maximum (475 nm) as a function of applied voltage. The results are given below in Table III.

Table III

| Voltage (volts) | Optical Density |
|---|---|
| 0 | 0.466 |
| 0.5 | 0.466 |
| 1.0 | 0.410 |
| 1.2 | 0.364 |
| 1.5 | 0.322 |
| 2 | 0.297 |
| 3 | 0.265 |
| 4 | 0.255 |
| 5 | 0.251 |
| 8 | 0.243 |
| 10 | 0.241 |
| 15 | 0.239 |
| 20 | 0.237 |

The results show that as the voltage is increased, the color fades.

EXAMPLE 14

A mixture of 0.34% of the dye of Example 3 in the ester host liquid crystal mixture of Example 12 was charged to a liquid crystal cell and optical density measured as in Example 13, except at 486 nm. The results are given below in Table IV.

Table IV

| Voltage (volts) | Optical Density |
|---|---|
| 0 | 0.816 |
| 1 | 0.684 |
| 1.5 | 0.624 |
| 2 | 0.47 |
| 3 | 0.354 |
| 4 | 0.329 |
| 5 | 0.319 |
| 8 | 0.301 |
| 10 | 0.298 |
| 15 | 0.289 |
| 20 | 0.286 |

EXAMPLE 15

A mixture of 0.19% of the dye of Example 4 in the ester host liquid crystal mixture of Example 12 was charged to a liquid crystal cell and optical density measured as in Example 13, except at 470 nm. The results are given below in Table V.

Table V

| Voltage (volts) | Optical Density |
|---|---|
| 0 | 0.530 |
| 0.5 | 0.528 |
| 1 | 0.508 |
| 1.2 | 0.393 |

Table V-continued

| Voltage (volts) | Optical Density |
| --- | --- |
| 1.5 | 0.341 |
| 2 | 0.318 |
| 2.5 | 0.289 |
| 3 | 0.279 |
| 4 | 0.272 |
| 5 | 0.268 |
| 10 | 0.261 |
| 15 | 0.258 |
| 20 | 0.257 |

What is claimed is:

1. A compound having the formula:

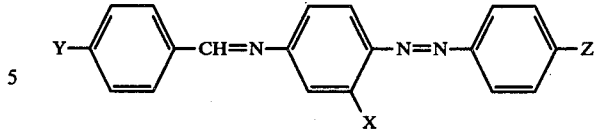

wherein Y and Z are different, one is nitro or cyano and the other is —N(R)$_2$ wherein R is alkyl or alkylene of 1 to 8 carbon atoms, and X is hydrogen, methyl, fluoro or chloro.

2. A compound according to claim 1 wherein R is an alkyl group of 1 to 4 carbon atoms.

3. A compound according to claim 1 wherein Y is cyano, X is methyl and R is butyl.

4. A compound according to claim 1 wherein Y is nitro, X is hydrogen and R is butyl.

5. A compound according to claim 1 wherein Y is cyano, X is hydrogen and R is butyl.

* * * * *